(12) United States Patent
Hyche

(10) Patent No.: US 12,242,717 B2
(45) Date of Patent: *Mar. 4, 2025

(54) METHOD, APPARATUS, AND COMPUTER PROGRAM PRODUCT FOR FACILITATING THE PLAYBACK OF INTERFACE EVENTS

(71) Applicant: Bytedance Inc., Wilmington, DE (US)

(72) Inventor: Martin Eric Hyche, Kingsport, TN (US)

(73) Assignee: BYTEDANCE INC., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/536,877

(22) Filed: Dec. 12, 2023

(65) Prior Publication Data

US 2024/0184440 A1 Jun. 6, 2024

Related U.S. Application Data

(63) Continuation of application No. 18/154,240, filed on Jan. 13, 2023, now Pat. No. 11,880,562, which is a
(Continued)

(51) Int. Cl.
*G06F 3/048* (2013.01)
*G06F 3/04817* (2022.01)
(Continued)

(52) U.S. Cl.
CPC ........ *G06F 3/0488* (2013.01); *G06F 3/04817* (2013.01); *G06F 3/0482* (2013.01)

(58) Field of Classification Search
CPC ... G06F 3/0488; G06F 3/04817; G06F 3/0482
See application file for complete search history.

(56) References Cited

U.S. PATENT DOCUMENTS 9,178,933 B1 * 11/2015 Soland .................... H04L 67/52
10,620,801 B1 4/2020 Fein et al.
(Continued)

OTHER PUBLICATIONS

U.S. Appl. No. 18/154,240, filed Mar. 13, 2023, now U.S. Pat. No. 11,880,562.
(Continued)

*Primary Examiner* — David E Choi
(74) *Attorney, Agent, or Firm* — Alston & Bird LLP

(57) ABSTRACT

Provided herein are method, apparatus, and computer program products for facilitating capture and play back of interface event data. One exemplary method may comprise providing, as a function of at least profile data, environmental data, transaction data, relevance data, and implicit data derived therefrom, a dynamic application environment, displaying the dynamic application environment on an dynamic application interface, capturing interface event data, the interface event data being based on user interaction with the dynamic application interface, and comprising of one or more interface events and a particular time at which each of the one or more interface events occurred, providing data to the play back device configured for initializing a play back environment, such that the play back environment receives the interface event data and performs play back, and outputting the one or more interface events in a relative time to the particular time.

20 Claims, 8 Drawing Sheets

Related U.S. Application Data continuation of application No. 17/646,016, filed on Dec. 27, 2021, now Pat. No. 11,579,768, which is a continuation of application No. 17/139,573, filed on Dec. 31, 2020, now Pat. No. 11,243,682, which is a continuation of application No. 16/542,349, filed on Aug. 16, 2019, now Pat. No. 10,908,807, which is a continuation of application No. 15/197,931, filed on Jun. 30, 2016, now Pat. No. 10,416,875.

(60) Provisional application No. 62/186,826, filed on Jun. 30, 2015.

(51) Int. Cl.
*G06F 3/0482* (2013.01)
*G06F 3/0488* (2022.01)

(56) References Cited

U.S. PATENT DOCUMENTS

| | | | | |
|---|---|---|---|---|
| 2011/0283239 | A1* | 11/2011 | Krishnan | G06Q 10/103 714/37 |
| 2013/0132566 | A1* | 5/2013 | Olsen | H04L 67/306 709/224 |
| 2014/0026156 | A1* | 1/2014 | Deephanphongs | H04N 21/251 725/12 |
| 2014/0095216 | A1* | 4/2014 | Radhakrishnan | G01C 21/3697 705/5 |
| 2014/0129505 | A1* | 5/2014 | Lin | G06Q 50/01 706/50 |
| 2014/0156746 | A1* | 6/2014 | Wheatley | H04N 21/4826 709/204 |
| 2014/0188927 | A1* | 7/2014 | Moxley | G06F 16/9535 707/769 |
| 2014/0279722 | A1* | 9/2014 | Singh | G06F 16/9535 706/11 |
| 2014/0280879 | A1* | 9/2014 | Skolicki | H04L 67/535 709/224 |
| 2014/0282135 | A1* | 9/2014 | Segre | G06F 9/451 715/764 |
| 2016/0062998 | A1* | 3/2016 | Spehr | G06F 16/24554 707/748 |

OTHER PUBLICATIONS

U.S. Appl. No. 17/646,016, filed Dec. 27, 2021, now U.S. Pat. No. 11,579,768.
U.S. Appl. No. 17/139,573, filed Dec. 31, 2020, now U.S. Pat. No. 11,243,682.
U.S. Appl. No. 16/542,349, filed Aug. 16, 2019, now U.S. Pat. No. 10,908,807.
U.S. Appl. No. 15/197,931, filed Jun. 30, 2016, now U.S. Pat. No. 10,416,875.

* cited by examiner ions that are included in embodiments of the present invention, many examples of which are described in detail herein.

METHOD, APPARATUS, AND COMPUTER PROGRAM PRODUCT FOR FACILITATING THE PLAYBACK OF INTERFACE EVENTS

CROSS REFERENCE TO RELATED APPLICATIONS

This application is a continuation of U.S. patent application Ser. No. 18/154,240, filed Jan. 13, 2023, which is a continuation of U.S. patent application Ser. No. 17/646,016, titled "Method, Apparatus, And Computer Program Product for Facilitating the Playback of Interface Events," filed Dec. 27, 2021 (now U.S. Pat. No. 11,579,768), which is a continuation of U.S. patent application Ser. No. 17/139,573, titled "Method, Apparatus, And Computer Program Product for Facilitating the Playback of Interface Events," filed Dec. 31, 2020, which is a continuation of U.S. patent application Ser. No. 16/542,349, titled "Method, Apparatus, And Computer Program Product for Facilitating the Playback of Interface Events," filed Aug. 16, 2019 (now U.S. Pat. No. 10,908,807), which is a continuation of U.S. patent application Ser. No. 15/197,931, titled "Method, Apparatus, And Computer Program Product for Facilitating the Playback of Interface Events," filed Jun. 30, 2016 (now U.S. Pat. No. 10,416,875), which claims the benefit of U.S. Provisional Application No. 62/186,826, titled, "Method, Apparatus, And Computer Program Product for Facilitating the Playback of Interface Events," filed Jun. 30, 2015, each of which is incorporated by reference herein in its entirety.

FIELD

Embodiments of the invention relate, generally, to facilitating the playback of interface events and more specifically to the providing of a dynamic application environment and playback of interface events logged therein.

BACKGROUND OF THE INVENTION

Providers may typically allow for contextually aware recording and playback of interface events. Applicant has identified a number of deficiencies and problems associated with conventional recording and playback systems. Through applied effort, ingenuity, and innovation, many of these identified problems have been solved by developing solutions that are included in embodiments of the present invention, many examples of which are described in detail herein.

SUMMARY OF THE INVENTION

In general, embodiments of the present invention provided herein include methods, apparatus, and computer program products for the providing of a dynamic application environment, capturing of interface events, initialization of a play back environment and performing playback of interface events.

In some embodiments, an apparatus may be provided for capturing and playing back interface event data comprising at least a processor, and a memory associated with the processor having computer coded instructions therein, the apparatus comprising a dynamic application environment determination and rendering module configured for providing, as a function of at least profile data, environmental data, transaction data, relevance data, and implicit data derived from a combination of one or more of the profile data, environmental data, transaction data, and relevance data, a dynamic application environment, and displaying the dynamic application environment on a dynamic application interface, a recording module, the recording module configured for capturing interface event data, the interface event data being based on of user interaction with the dynamic application interface, the interface event data comprising of one or more interface events, each interface event occurring a particular time, and the particular time at which each of the one or more interface events occurred, an initialization module, the initialization module configured for receiving play back device data, receiving data indicative of the dynamic application environment, providing data to the play back device configured for initializing a play back environment, such that the play back environment receives the interface event data and performs play back, and a play back module, the play back module configured for accessing the interface event data, and outputting the one or more interface events in a relative time to the particular time.

In some embodiments, the recording module is configured for storing the interface event data, and the play back module is configured for accessing the interface event data, and extracting the one or more interface events and the particular time of occurrence. In some embodiments, the time scale at which the one or more interface events are provided to the play back device is real time.

In some embodiments, the initialization module is further configured for identifying an initial state of the dynamic application environment based on the profile data, environmental data, transaction data, relevance data, and implicit data derived from a combination of one or more of the profile data, environmental data, transaction data, and relevance data, and providing data configured for implementing a play back state based on the initial state, the play back state configured to recreate a same computing environment on the play back device.

In some embodiments, the initialization module provides a portion of the data indicative of the dynamic application environment to the play back device, the portion of information comprising a category, sub-category, price range of a relevant promotion being provided via an impression in the dynamic application environment.

In some embodiments, interface events comprise one or more of text input, scrolls, swipes, clicks, presses, selections, and mouseovers.

In some embodiments, interface event data comprises a lack one or more of text input, scrolls, swipes, clicks, presses, selections, and mouseovers, and a time period for the lack of the text input, scrolls, swipes, clicks, presses, selections, and mouseovers.

In some embodiments, the play back module is configured to aid in performance of debugging by receiving input from the play back device and performing at least a pause, rewind, fast-forward, speed up, or slow-down in the transmission of the interface event data in response to the input.

In some embodiments, the play back module is configured to aid in performance of quality assurance or debugging by receiving input from the play back device and providing a single interface event at a time in response to the input.

In some embodiments, a computer program product may be provided for capturing and playing back interface event data, the computer program product comprising at least one non-transitory computer-readable storage medium having computer-executable program code instructions stored therein, the computer-executable program code instructions comprising program code instructions for providing, via a dynamic application environment determination and rendering module, as a function of at least profile data, environmental data, transaction data, relevance data, and implicit data derived from a combination of one or more of the profile data, environmental data, transaction data, and relevance data, a dynamic application environment, displaying the dynamic application environment on a dynamic application interface, capturing, via a recording module, interface event data, the interface event data being based on of user interaction with the dynamic application interface, the interface event data comprising of one or more interface events, each interface event occurring a particular time, and the particular time at which each of the one or more interface events occurred, receiving, via an initialization module, play back device data, receiving data indicative of the dynamic application environment, providing data to the play back device configured for initializing a play back environment, such that the play back environment receives the interface event data and performs play back, and accessing, via a play back module, the interface event data, and outputting the one or more interface events in a relative time to the particular time.

In some embodiments, the computer-executable program code instructions further comprise program code instructions for storing, via the recording module, the interface event data, accessing, via the play back module, the interface event data, and extracting the one or more interface events and the particular time of occurrence. In some embodiments, the time scale at which the one or more interface events are provided to the play back device is real time.

In some embodiments, the computer-executable program code instructions further comprise program code instructions for Identifying, via the initialization module, an initial state of the dynamic application environment based on the profile data, environmental data, transaction data, relevance data, and implicit data derived from a combination of one or more of the profile data, environmental data, transaction data, and relevance data, and providing data configured for implementing a play back state based on the initial state, the play back state configured to recreate a same computing environment on the play back device.

In some embodiments, the computer-executable program code instructions further comprise program code instructions for providing, via the initialization module, a portion of the data indicative of the dynamic application environment to the play back device, the portion of information comprising a category, sub-category, price range of a relevant promotion being provided via an impression in the dynamic application environment.

In some embodiments, interface events comprise one or more of text input, scrolls, swipes, clicks, presses, selections, and mouseovers. In some embodiments, interface event data comprises a lack one or more of text input, scrolls, swipes, clicks, presses, selections, and mouseovers, and a time period for the lack of the text input, scrolls, swipes, clicks, presses, selections, and mouseovers.

In some embodiments, the computer-executable program code instructions further comprise program code instructions for aiding in performance of debugging by receiving, via the play back module, input from the play back device and performing at least a pause, rewind, fast-forward, speed up, or slow-down in the transmission of the interface event data in response to the input.

In some embodiments, the computer-executable program code instructions further comprise program code instructions for aiding in performance of quality assurance or debugging by receiving, via the play back module, input from the play back device and providing a single interface event at a time in response to the input.

In some embodiments, a method may be provided for capturing and playing back interface event data, the method comprising providing, via a dynamic application environment determination and rendering module, as a function of at least profile data, environmental data, transaction data, relevance data, and implicit data derived from a combination of one or more of the profile data, environmental data, transaction data, and relevance data, a dynamic application environment, displaying the dynamic application environment on a dynamic application interface, capturing, via a recording module, interface event data, the interface event data being based on of user interaction with the dynamic application interface, the interface event data comprising of one or more interface events, each interface event occurring a particular time, and the particular time at which each of the one or more interface events occurred, receiving, via an initialization module, play back device data, receiving data indicative of the dynamic application environment, providing data to the play back device configured for initializing a play back environment, such that the play back environment receives the interface event data and performs play back, and accessing, via a play back module, the interface event data, and outputting the one or more interface events in a relative time to the particular time.

In some embodiments, the method may further comprise storing, via the recording module, the interface event data, accessing, via the play back module, the interface event data, and extracting the one or more interface events and the particular time of occurrence. In some embodiments, the time scale at which the one or more interface events are provided to the play back device is real time.

In some embodiments, the method may further comprise Identifying, via the initialization module, an initial state of the dynamic application environment based on the profile data, environmental data, transaction data, relevance data, and implicit data derived from a combination of one or more of the profile data, environmental data, transaction data, and relevance data, and providing data configured for implementing a play back state based on the initial state, the play back state configured to recreate a same computing environment on the play back device.

In some embodiments, the method may further comprise providing, via the initialization module, a portion of the data indicative of the dynamic application environment to the play back device, the portion of information comprising a category, sub-category, price range of a relevant promotion being provided via an impression in the dynamic application environment.

In some embodiments, interface events comprise one or more of text input, scrolls, swipes, clicks, presses, selections, and mouseovers.

In some embodiments, interface event data comprises a lack one or more of text input, scrolls, swipes, clicks, presses, selections, and mouseovers, and a time period for the lack of the text input, scrolls, swipes, clicks, presses, selections, and mouseovers.

In some embodiments, the method may further comprise aiding in performance of debugging by receiving, via the play back module, input from the play back device and performing at least a pause, rewind, fast-forward, speed up, or slow-down in the transmission of the interface event data in response to the input.

In some embodiments, the method may further comprise aiding in performance of quality assurance or debugging by receiving, via the play back module, input from the play back device and providing a single interface event at a time in response to the input.

BRIEF DESCRIPTION OF THE FIGURES

Reference will now be made to the accompanying drawings, which are not necessarily drawn to scale, and wherein.

DETAILED DESCRIPTION

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Overview

Various embodiments of the invention are directed to a device configured for capturing and play back of interface events in a dynamic application environment. More specifically, various embodiments of the present invention may be directed to a device configured for providing a dynamic application environment and capturing interface events, the interface events being indicative of user interaction with a dynamic application environment. And furthermore, various embodiments of the present invention may be directed to a device configured for initializing a second environment such that the interface events can be played back on the second environment and performing play back of the interface events on a play back device.

Figure 6B:
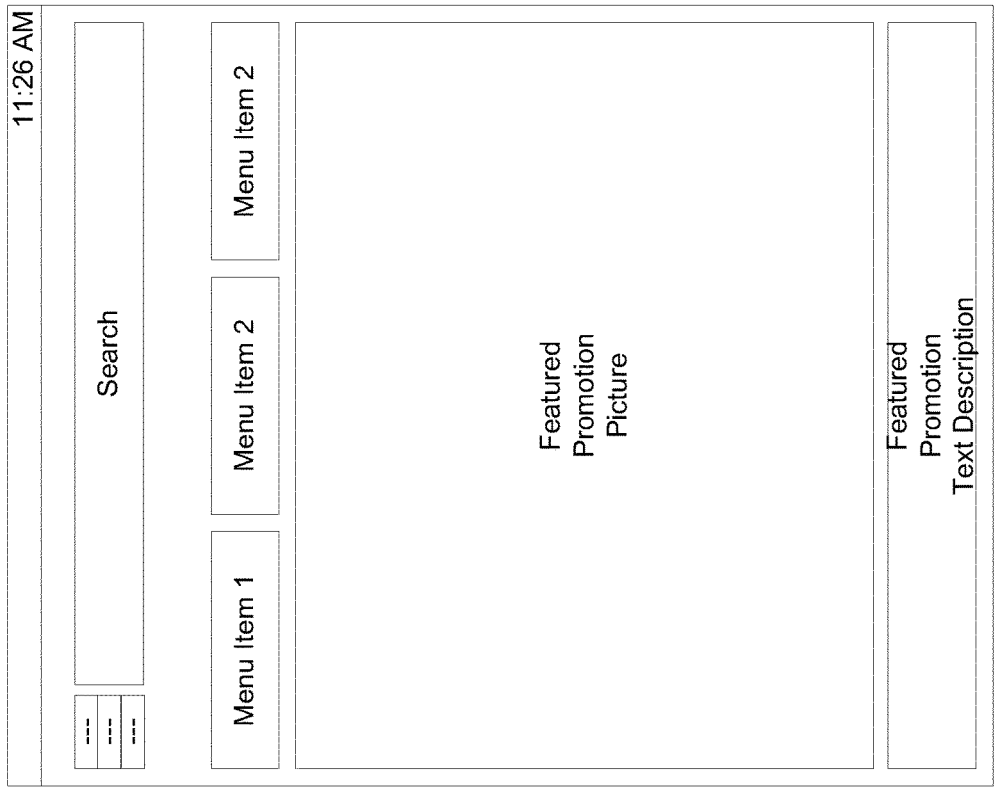
FIGS. 6A and 6B show example graphical user interface displays that may be presented, in accordance with some embodiments of the present invention.
Figure 6A:
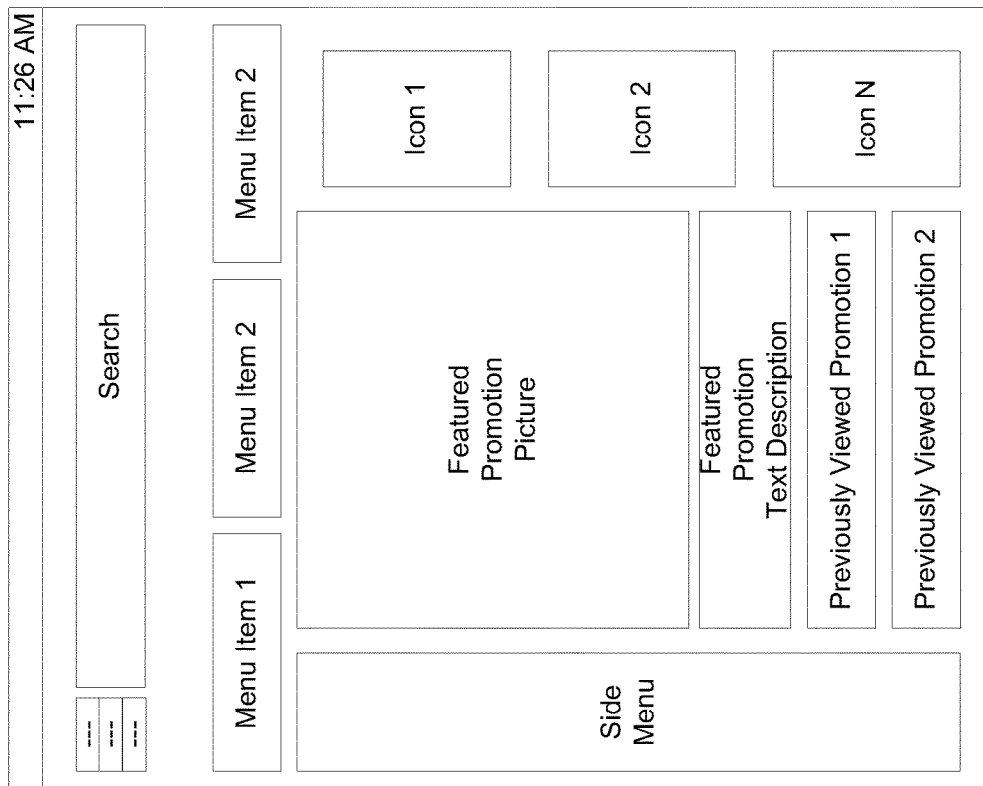

For example, a dynamic application environment may be provided to a user, the dynamic application environment being configured to be adaptive and intuitive. In one exemplary embodiment, a promotion and marketing system may be configured to provide one or more promotions via one or more impressions configured for display on a dynamic interface to a consumer, the promotions being selected and/or provided based on one or more relevance determinations (e.g., those promotions provided to a first consumer may be selected based on, for example, promotions scores of each of one or more available promotions). Moreover, as shown in FIGS. 6A and 6B, the specific layout, features, or characteristic information of the particular promotions, or more generally, components or items, may differ between users. For example, the specific layout, features, or characteristic information of the particular promotions, or more generally, components or items, may be a function of, for example, profile data, environmental data, transaction data, relevance data, and implicit data derived therefrom.

Interface event data may then be captured. Interface events may be input signals that may be derived from, but are not limited to, text input, searches, scrolls, swipes, clicks, presses, selections, or mouseovers. Interface event data may comprise one or more interface events and the particular time at which each of the one or more interface events occurred.

The device may further be configured for identifying an initial state of the dynamic application environment based on, for example, the profile data, environmental data, transaction data, relevance data, and implicit data derived therefrom and providing data configured for implementing a play back state based on the initial state, the play back state configured to recreate a same computing environment on the play back device. Once a play back environment on the play back device is established or implemented, interface event play back may be performed and the interface events may be transmitted to the play back device at, for example time intervals relative to the particular times associated with each interface event.

Relevance

A promotion score may be a representation of a relevance a respective promotion has with a consumer. The promotion score may be generated based on a combination of at least one of information identifying consumer and/or promotion attributes, consumer profiles/sub-profiles, consumer focused deal types and information identifying the past performance of promotions. A relevance module may include one or more components for accessing past performance data and generating a promotion score for each of a plurality of promotion (with the promotion score being a representation of a probability that a particular consumer will accept the promotion, and/or a representation of a relevance of the promotion to the consumer). The promotion score may then be referenced when determining whether to select the promotion for presentation to the consumer within an electronic correspondence. The promotion score may also be referenced when determining a position within the electronic correspondence to assign to the promotion.

Additional descriptions of relevance determination algorithms for identifying promotions relevant to a consumer or other profile data that may be used alternatively or additionally are described in U.S. patent application Ser. No. 13/411,502, filed Mar. 2, 2012, titled "RELEVANCE SYSTEM FOR CONSUMER DEALS", U.S. patent application Ser. No. 13/829,581 entitled "PROMOTION OFFERING SYSTEM" filed on Mar. 14, 2013, and U.S. patent application Ser. No. 12/776,028, now U.S. Pat. No. 8,355,948, titled "SYSTEM AND METHODS FOR DISCOUNT RETAILING" filed on May 7, 2010, the entirety of each is incorporated by reference herein.

LUI

One example of a dynamic application environment is a learning user interface (LUI). Additional description related to a learning user interface that is configured to be adaptive, intuitive, and to allow a user (e.g., a consumer, provider, provider employee, or promotion and marketing service) to visualize or perceive information (e.g., transaction data, business data, relevancy data, etc.) associated with a set of items. The interface 1 may present one or more dynamic icons to a user, the dynamic icons visually representing one or more corresponding items, the interface configured to visually bias the dynamic icons in order to indicate a suggested icon to a user relative to a secondary icon, are described in U.S. patent application Ser. No. 14/453,913, filed Aug. 7, 2014, titled "Learning User Interface" which is a continuation of U.S. patent application Ser. No. 14/230,970, which is entitled "Learning User Interface" and was filed Mar. 31, 2014, and is also a continuation of U.S. patent application Ser. No. 14/230,980, which is entitled "Learning User Interface" and was filed Mar. 31, 2014, and is also a continuation of U.S. patent application Ser. No. 14/230,996, which is entitled "Learning User Interface" and was filed Mar. 31, 2014, and is also a continuation of U.S. patent application Ser. No. 14/231,015, which is entitled "Learning User Interface" and was filed Mar. 31, 2014, each of which is incorporated by reference herein in its entirety. This application and each of the aforementioned applications claims priority under 35 U.S.C. § 119 to U.S. Provisional Application No. 61/932,046, which is entitled "Living User Interface" and was filed Jan. 27, 2014, which is also incorporated by reference herein in its entirety.

Terms

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may include, but is not limited to, a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "promotion" may include, but is not limited to, any type of offered, presented or otherwise indicated reward, discount, coupon, credit, deal, incentive, discount, media or the like that is indicative of a provider value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a provider value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the provider value is $50. In this example, the residual value may be equal to the accepted value.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "item" refers to any product, good, promotion, service, option, or other tangible or intangible item that may be displayed in a user interface.

As used herein, the term "feature" refers to the size, shape, color, text, highlighting, shading, opacity, image overlay, or any other discernible attribute of a tangible or intangible visualization of an item.

As used herein, the term "profile identifier" refers to any data that identifies a user, consumer, provider, provider employee, or promotion and marketing service. For example, and without limitation, a profile identifier may include a unique identifier, an IP address, a MAC address, a merchant identifier, a customer identifier, and the like.

As used herein, the term "profile data" refers to any data associated with a profile identifier, such as, but not limited to, transaction data, biographical data, preference data, or any other data that may serve to distinguish one or more profiles from each other.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like. In some embodiments, "transaction data" further refer to any item or profile data related to the buying, selling, or offering of an item, such as, but not limited to, sales data including historical and predicted revenue for each item, historical and predicted profits for each item, quantities sold for each item, quantity of customers purchasing each item, overall selection rate of each item, popularity of an item, or a selection rate per transaction or per customer of each item. Transaction data may also include redemption data, in the case of a promotion that must be redeemed, or may include return data for an item or promotion that is returned. In some embodiments, transaction data may include a consumer rating of an item. The transaction data may also include transactions with respect to profile information, such as transactions involving a single profile or related group of profiles.

As used herein, the term "environmental data" refers to contextual or environmental information associated with an item and/or associated with transactions involving items such as, without limitation, a time of day, time of year, weather, season, geographic or hyper-geographic location, or any other data that gives context to an item and/or to a transaction.

As used herein, the term "business data" refers to commercial or strategic data associated with an item that may define metrics for a provider or promotion and marketing service. For example and without limitation, goal data, such as sales goals, impression goals, redemption goals, revenue goals, profit goals or inventory data may serve as business data.

As used herein, the term "characteristic information" refers to any identifying attributes of an item that may serve to distinguish the item from other items, such as, but not limited to, physical characteristics (e.g. color, texture, flavor, crunchiness, etc.) and/or health characteristics (e.g. vitamin and nutrient content).

As used herein, the term "biographical data" refers to information associated with a person(s) (e.g., consumer, provider employee, etc.) identified in a profile, such as, for example, birth dates, allergies, socio-economic data, interests, place of residence, login credential information, and/or any other identifying information about a profile.

As used herein, the term "preference data" refers to one or more options associated with a profile, such that the preference data tracks the profile holder's interests and selections for various user-selectable interface options. Preference data may also include, without limitation, location data (e.g., GPS data, operating system location, etc.) associated with activity of a user associated with a profile.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer.

Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic data available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

While offering electronic marketing services, a promotion and marketing system may also seek to perform services related to improved (1) debugging; (2) design; and (3) quality assurance. Existing methods aren't good because they can't account for the dynamic user environment provided by the promotion and marketing service.

To most efficiently, reliably, and safely offer digital promotions through a promotion and marketing service, a promotion and marketing system must be able to perform a plurality of additional actions and/or services including, but not limited to, (1) debugging; (2) design; and (3) quality assurance. The performance of such actions and/or services by the promotion and marketing system thusly allows and/or enables a merchant to provide promotions using the promotion and marketing service.

The inventors have determined, however, that because use of the application software is performed on a remote user device and because users are provided customized application environments, performance of those actions and/or services become significantly more complex. That is, debugging requires the software to be executed on the remote user device, loading data to proxy, etc., design improvements require monitoring user interaction with existing designs and improving the experience, and quality assurance requires monitoring more than bug reports. Specifically, debugging generally is performed with a log file, which is a text file which contains a list of the interactions between the user and the debugger. However, nothing can typically be done or gleaned from the log files beyond what can be done with text files.

While current methods of recording and playback of interface events are available where the software is generally contextually aware of, for example, application versions, hardware settings, or the like, the inventors have determined that available processes cannot account for the customized app environment that users of the promotion and marketing service receive.

That is, interface events having occurred on a dynamically customized environment, such as an environment that accounts for consumer-specific information and implicit data related to, for example, data derived from previous uses that may be construed from page views and associated durations and click throughs, downloads, purchases, or any other activity and generates relevance data therefrom are not recordable and reproducible using current methods.

The inventors have identified various problems and difficulties that occur in providing such a dynamic environment, including the tracking, storing and retrieving of consumer related data, as well as the identifying and correlating of relationships and other associations among elements of electronic marketing information.

Moreover, the inventors have determined that even in the event that these events can be captured, the complex nature of reproducing that environment for playback provides other problems and difficulties.

Electronic systems have been developed that capture user event data and allow playback of the data. However, these solutions, in some examples, still require the same application environment for recording and playback.

The inventors have realized that, without processes that allow events to be captured on a dynamic application environment and reproduced in a different playback environment, a promotion and marketing service may be unable to provide adequate debugging, design and quality assurance services, and thusly, merchants may forego generating promotions resulting in lost revenue of both the merchant and the promotion and marketing service.

The inventors have therefore determined that existing electronic systems for recording and playback of user-events fail to address these issues. As a result of these problems and others that may arise from time to time, flaws may be introduced into the process of providing promotions to consumers and/or allowing merchants to generate promotions. In many cases, without the ability to accurately record interface events from a dynamic application environment and play back those interface events, the providing of dynamic application environments may become too inefficient or completely impossible.

Exemplary System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

Figure 1:
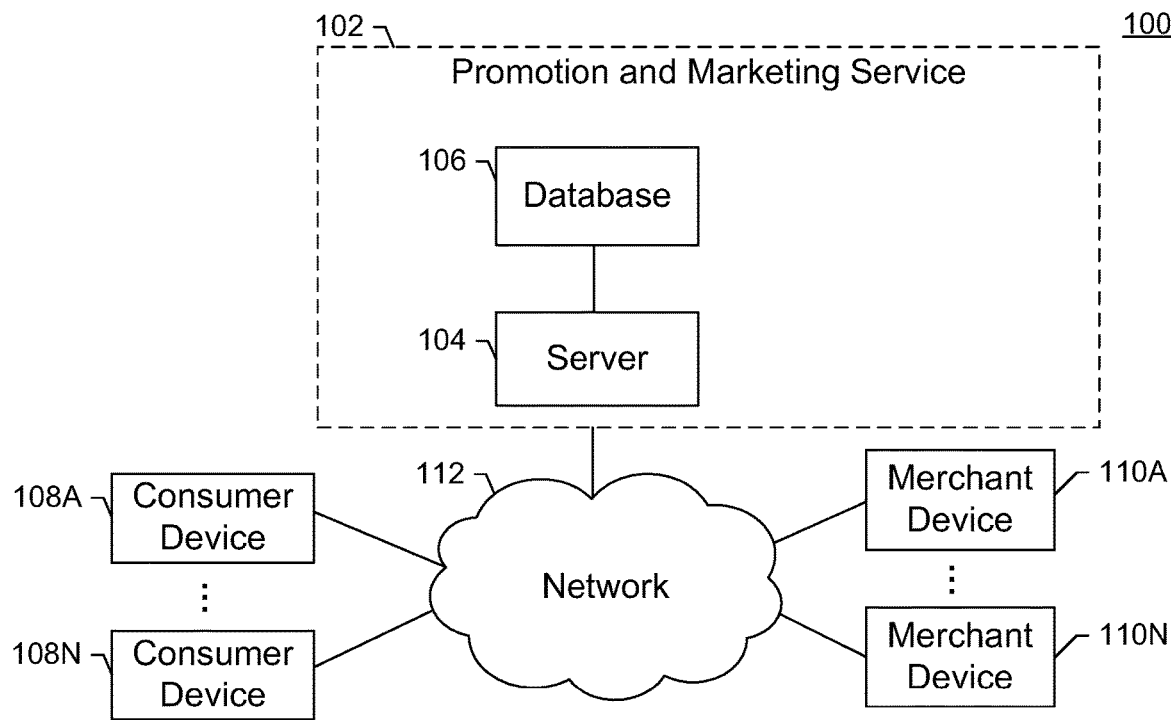
FIG. 1 illustrates an example system in accordance with some embodiments discussed herein.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic information among one or more consumer devices, merchant devices, and the promotion and marketing service is described below with respect to FIG. 3.

Example Apparatus for Implementing Embodiments of the Present Invention

Figure 2:
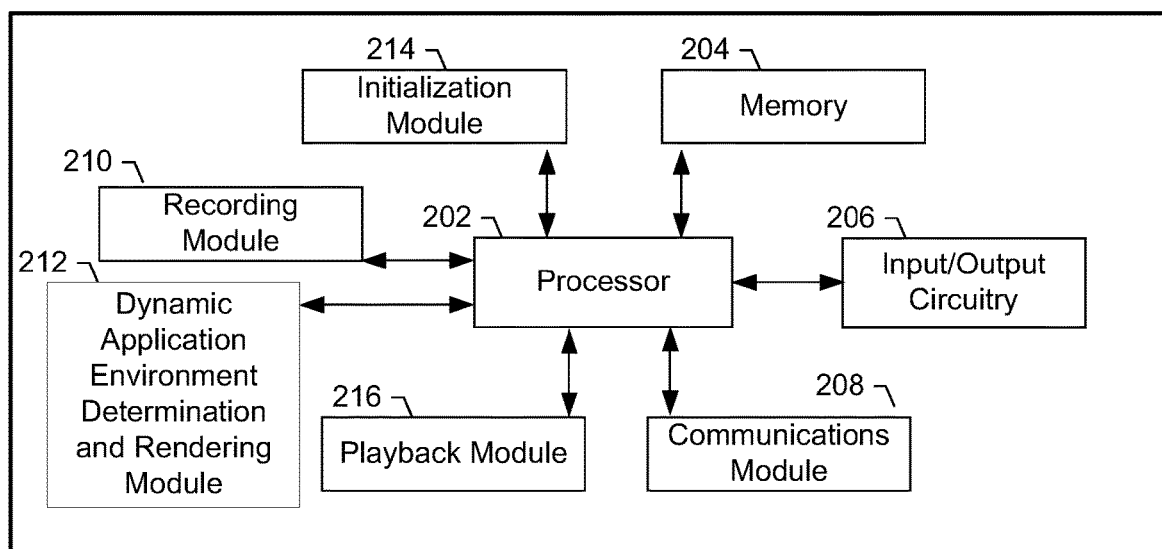
FIG. 2 illustrates an example apparatus in accordance with some embodiments discussed herein.

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, recording module 210, dynamic application environment determination and rendering module 212, initialization module 214, and playback module 216. The apparatus 200 may be configured to execute the operations described above with respect to FIG. 1 and below with respect to FIG. 3. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Recording circuitry 210 includes hardware configured to capture and record interface events received, identified and/or determined on an interface of a dynamic application environment based on data received via a network interface. The recording circuitry 210 may utilize processing circuitry, such as the processor 202, to perform these actions. The recording circuitry 210 may receive the clickstream data via a network interface provided by the communications circuitry 208. However, it should also be appreciated that, in some embodiments, the recording circuitry 210 may include a separate processor, specially configured field programmable gate array (FPGA), or application specific interface circuit (ASIC) to perform the capture and recording of the interface events. The recording circuitry 210 is therefore implemented using hardware components of the apparatus configured by either hardware or software for implementing these planned functions.

Dynamic application environment determination and rendering circuitry 212 includes hardware configured to determine and render the components, configured for display, of a dynamic application environment. The dynamic application environment determination and rendering circuitry 212 may utilize processing circuitry, such as the processor 202, to perform these actions. The dynamic application environment determination and rendering circuitry 212 may receive data from, for example, a relevance module, transaction data database, biographic data database, preference data database, implicit data database or the like, via a network interface provided by the communications circuitry 208. However, it should also be appreciated that, in some embodiments, the dynamic application environment determination and rendering circuitry 212 may include a separate processor, specially configured field programmable gate array (FPGA), or application specific interface circuit (ASIC) to perform receive data that enables the determination and rendering of components, configured for display, of a dynamic application environment. The dynamic application environment determination and rendering circuitry 212 is therefore implemented using hardware components of the apparatus configured by either hardware or software for implementing these planned functions.

Initialization circuitry 214 includes hardware configured to identify and/or receive data indicative of characteristics of a playback environment via a network interface as well as provide data indicative of the dynamic application environment such that captured and/or recorded interface events may be played back. The initialization circuitry 214 may utilize processing circuitry, such as the processor 202, to perform these actions. The initialization circuitry 214 may receive the clickstream data via a network interface provided by the communications circuitry 208. However, it should also be appreciated that, in some embodiments, the initialization circuitry 214 may include a separate processor, specially configured field programmable gate array (FPGA), or application specific interface circuit (ASIC) to identify and/or receive data indicative of characteristics of a playback environment. The initialization circuitry 214 is therefore implemented using hardware components of the apparatus configured by either hardware or software for implementing these planned functions.

Playback circuitry 216 includes hardware configured to receive data configured to receive and/or access interface events, having been for example captured, recorded, and/or stored, and provide data indicative of the interface events to a play back environment via a network interface. The playback circuitry 216 may utilize processing circuitry, such as the processor 202, to perform these actions. The playback circuitry 216 may receive the user-event or log data via a network interface provided by the communications circuitry 208. However, it should also be appreciated that, in some embodiments, the playback circuitry 216 may include a separate processor, specially configured field programmable gate array (FPGA), or application specific interface circuit (ASIC) to receive and/or access interface events, having been for example captured, recorded, and/or stored, and provide data indicative of the interface events to a play back environment. The playback circuitry 216 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Exemplary Data Flow

Figure 3:
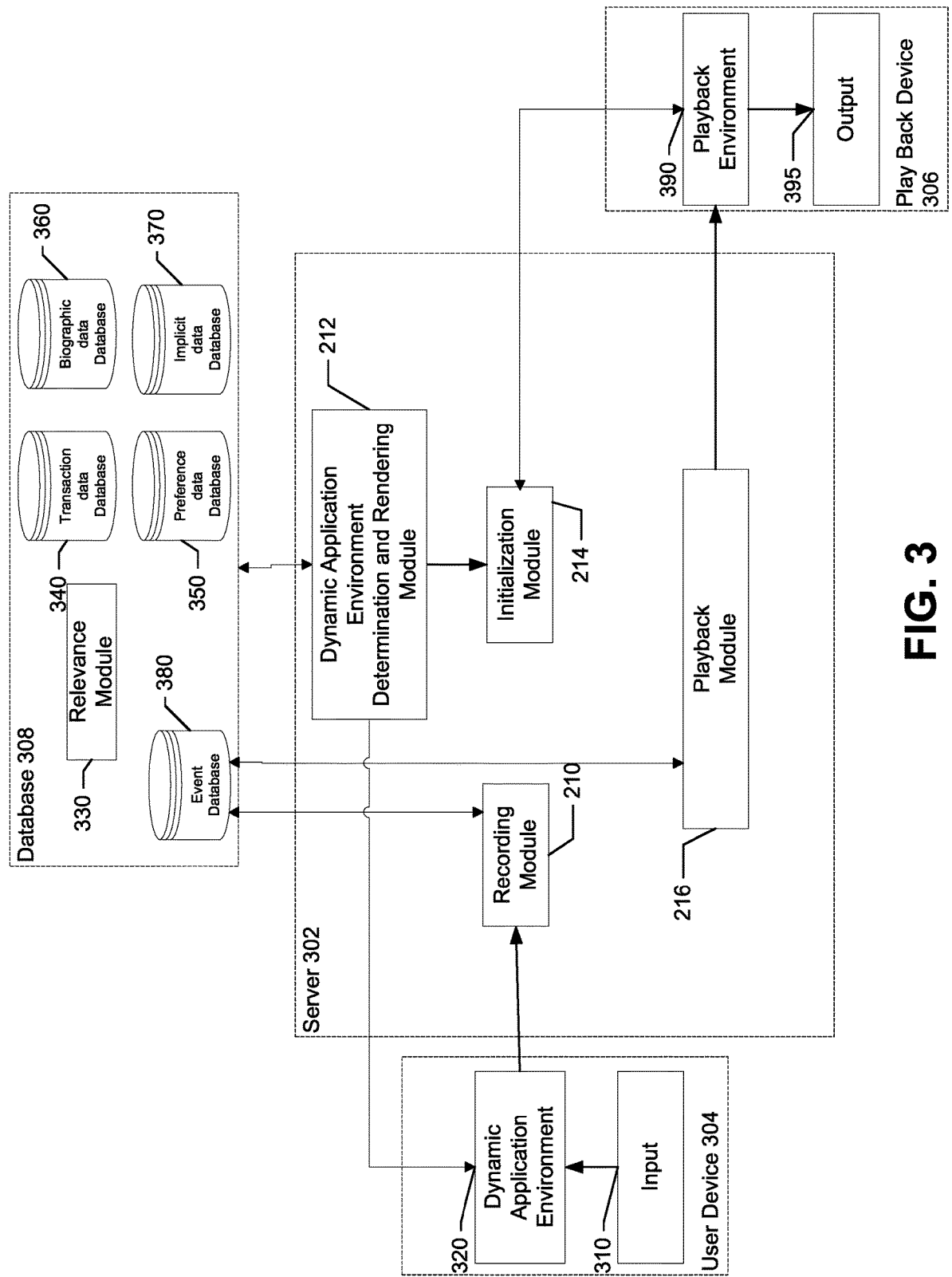
FIG. 3 illustrates an example data flow depicting interactions between various components of an example system, in accordance with some embodiments discussed herein.

FIG. 3 depicts an example data flow illustrating interactions between a server 302 and one or more user devices 304, and one or more play back devices 306. The server 302 may be implemented in the same or a similar fashion as the server 104 as described above with respect to FIG. 1, the one or more user devices 304 may be implemented in the same or a similar fashion as the consumer devices 108A-108N or the one or more merchant devices 306 as described above with respect to FIG. 1. The one or more play back devices 306 may also be implemented in the same or a similar fashion as the consumer devices 108A-108N or the one or more merchant devices 306 as described above with respect to FIG. 1.

Input 310 (e.g., touches, scrolls, swipes, etc.) are received by the dynamic application environment 320, which is configured for output on user device 304. For example, a dynamic application environment may be provided by the promotion and marketing service to a consumer device or merchant device. The dynamic application environment may be generated by the dynamic application environment determination and rendering module 212.

The dynamic application environment determination and rendering module 212 may be configured to receive, access, or otherwise utilize a plurality of data types, including data received, accessed and/or sensed from the user device 304 (e.g., device model, location, etc.), as well as data received and/or accessed from database 308. Database 308 may include one or more of a relevance module 330, transaction data database 340, biographic data database 360, preference data database 350, and implicit data database 370.

The input 310 may be captured, received or otherwise determined by the recording module and subsequently stored or logged in the event database 380 (e.g., as an .sdk file or the like).

Playback function may include initialization module 216 receiving, accessing or otherwise determining information about the playback environment (e.g., device, operating system, location, etc.) from, for example, the play back device 306 as well as receiving, accessing or otherwise determining information about the dynamic application environment from one or more of the dynamic application environment determination and rendering module 212 or, in some embodiments, the user device 304. The initialization module 214 may be further configured to generate information such that events stored in event database 380 may be played back on the play back environment 390 on play back device 306. The play back module 216 may be configured to access, receive or otherwise determine user event data, for example, in the form of an interface event log or the like, and transmit the interface event data or interface event log data to the play back environment 390 which then provides output 395.

Exemplary Operation for Implementing
Embodiments of the Present Invention

Figure 4:
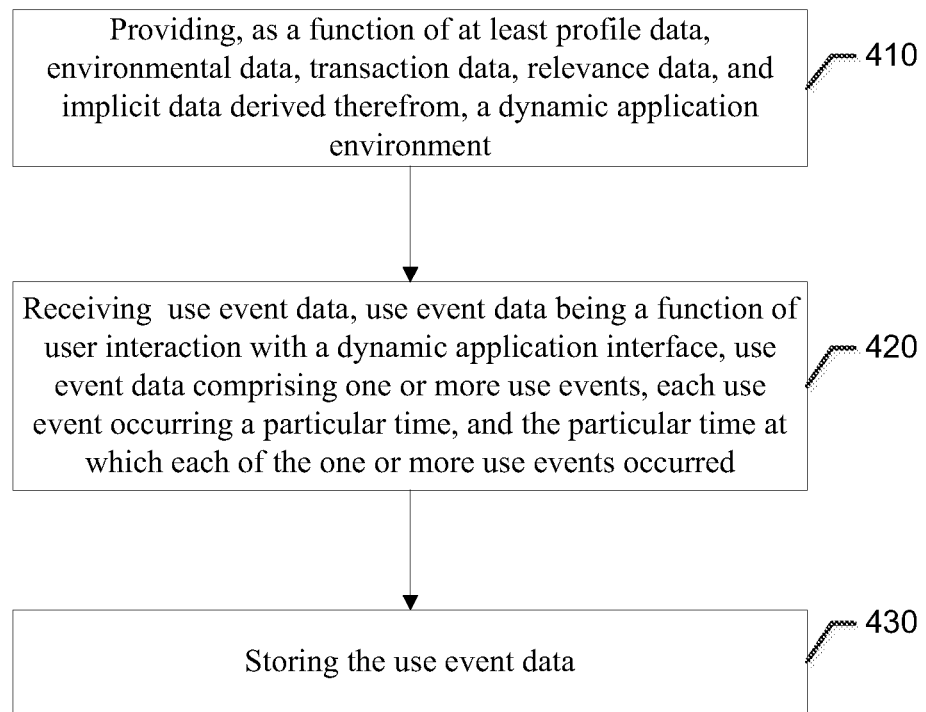
FIG. 4 is a flowchart illustrating a method for capturing interface events, in accordance with an example embodiment.
Figure 5:
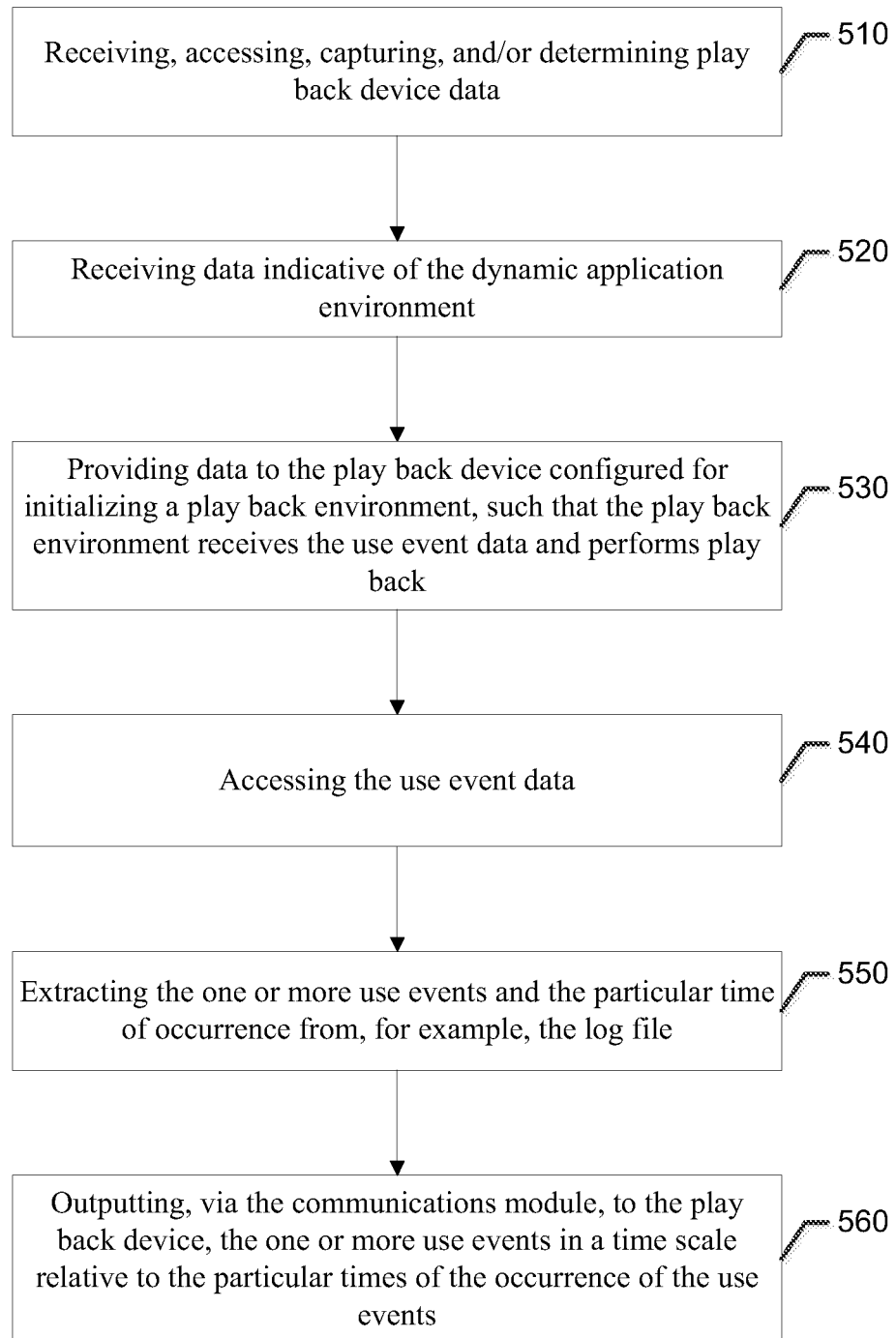
FIG. 5 is a flowchart illustrating a method for performing play back, in accordance with an example embodiment.

In some embodiments, an apparatus may be configured to facilitate capturing and play back of interface events in a dynamic application environment. FIGS. 4 and 5 illustrate exemplary processes for receiving signals as interface events indicative of user interaction with a dynamic application environment and performing play back of the interface events on a play back device. FIG. 4 shows an example method that may be executed by one or more machines, for example by apparatus 200, including dynamic application environment determination and rendering module 212 and recording module 210 of FIG. 2, for the determination and rendering of the dynamic application environment as well as the capturing of the interface event data, in accordance with some embodiments discussed herein. FIG. 5 then shows an example method that may be executed by one or more machines, for example by apparatus 200, including initialization module 214 and the play back module 216 of FIG. 2, for the implementing or a play back environment on a play back device and the outputting of the interface event data, in accordance with some embodiments discussed herein Capturing Operation FIG. 4 shows a flowchart depicting an example of a process 400 for capturing interface events, for example, from an interface of a dynamic application environment, in accordance with embodiments of the present invention. The flowchart shows that a dynamic application environment is determined and rendered for display on a user device and as input is received, interface events may be captured. The process 400 may be performed by an apparatus, such as the apparatus 200 described above with respect to FIG. 2.

As shown in block 410 of FIG. 4, an apparatus, such as apparatus 200, may be configured for providing a dynamic application environment. For example, in offering electronic marketing services, a promotion and marketing system may be configured to provide one or more promotions via one or more impressions configured for display on a dynamic interface to a consumer, the promotions being selected and/or provided based on one or more relevance determinations (e.g., those promotions provided to a first consumer selected based on, for example, promotions scores of each of one or more available promotions).

In some embodiments, the apparatus may be configured for determining, rendering, and providing a dynamic application environment. One such example of a dynamic application environment is LUI. In some embodiments, the dynamic application environment, including the components or items thereof and the layout, features, or characteristic information of the components and items, may be a function of one or more of profile data, environmental data, transaction data, relevance data, and implicit data derived from a combination of one or more of the profile data, environmental data, transaction data, and relevance data.

Figure 7:
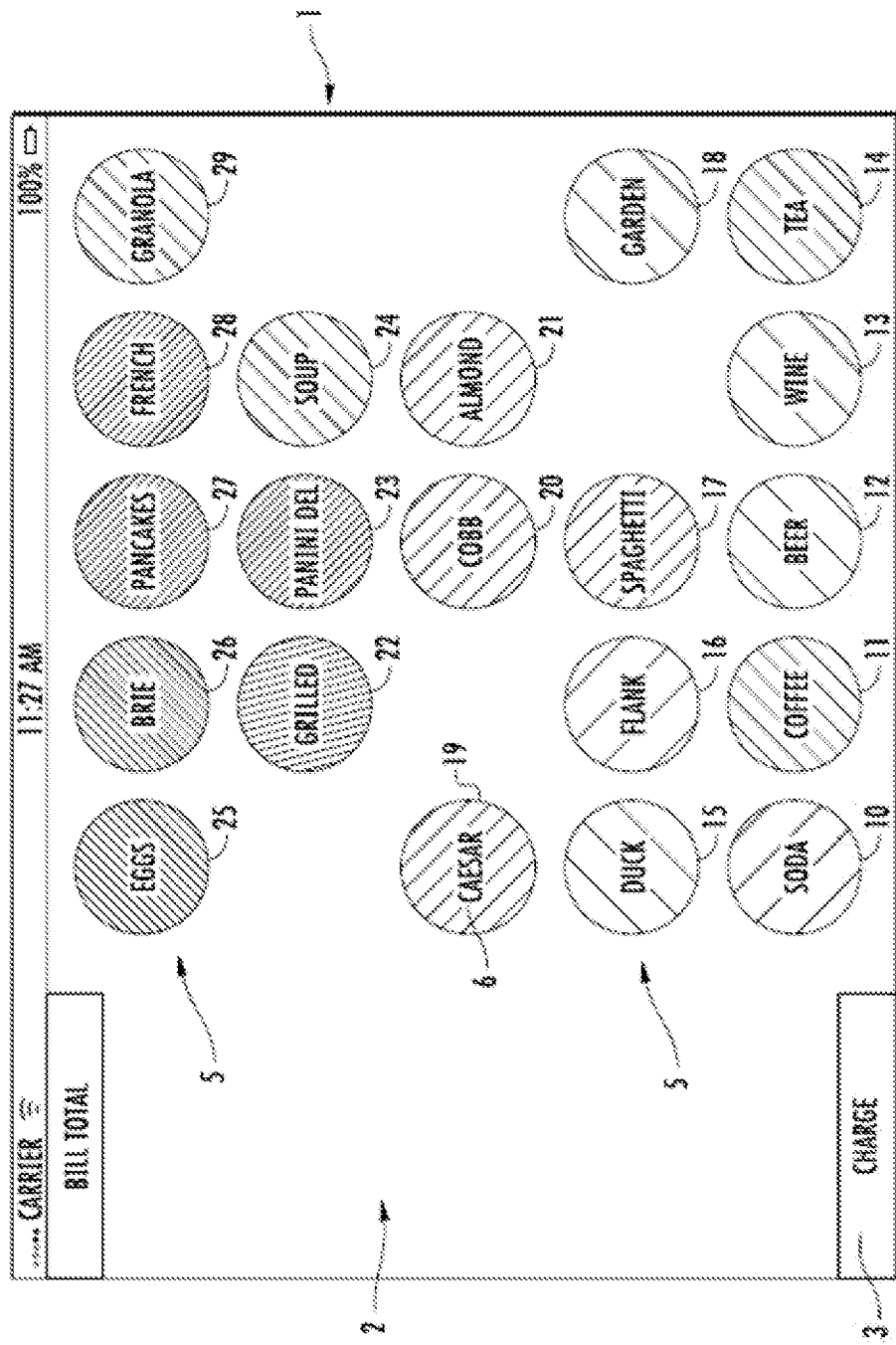
FIG. 7 illustrates an example interface having a plurality of dynamic icons depicting transaction data over a one month elapsed time period in accordance with some embodiments discussed herein.

In some embodiments, an interface may be configured to be used by a provider, consumer, promotion and marketing service, or a third-party and may be tailored to suit each party's interests or specific data needs. For example, the embodiment shown in FIG. 7 illustrates a point of sale restaurant interface with menu options as the available items. In other embodiments, the interface 1 may be configured as an online shopping interface. One of ordinary skill in the art will appreciate that the LUI related concepts discussed herein, may be applied to better visualize characteristics of interest for a wide variety of item and/or data sets.

Figure 8:
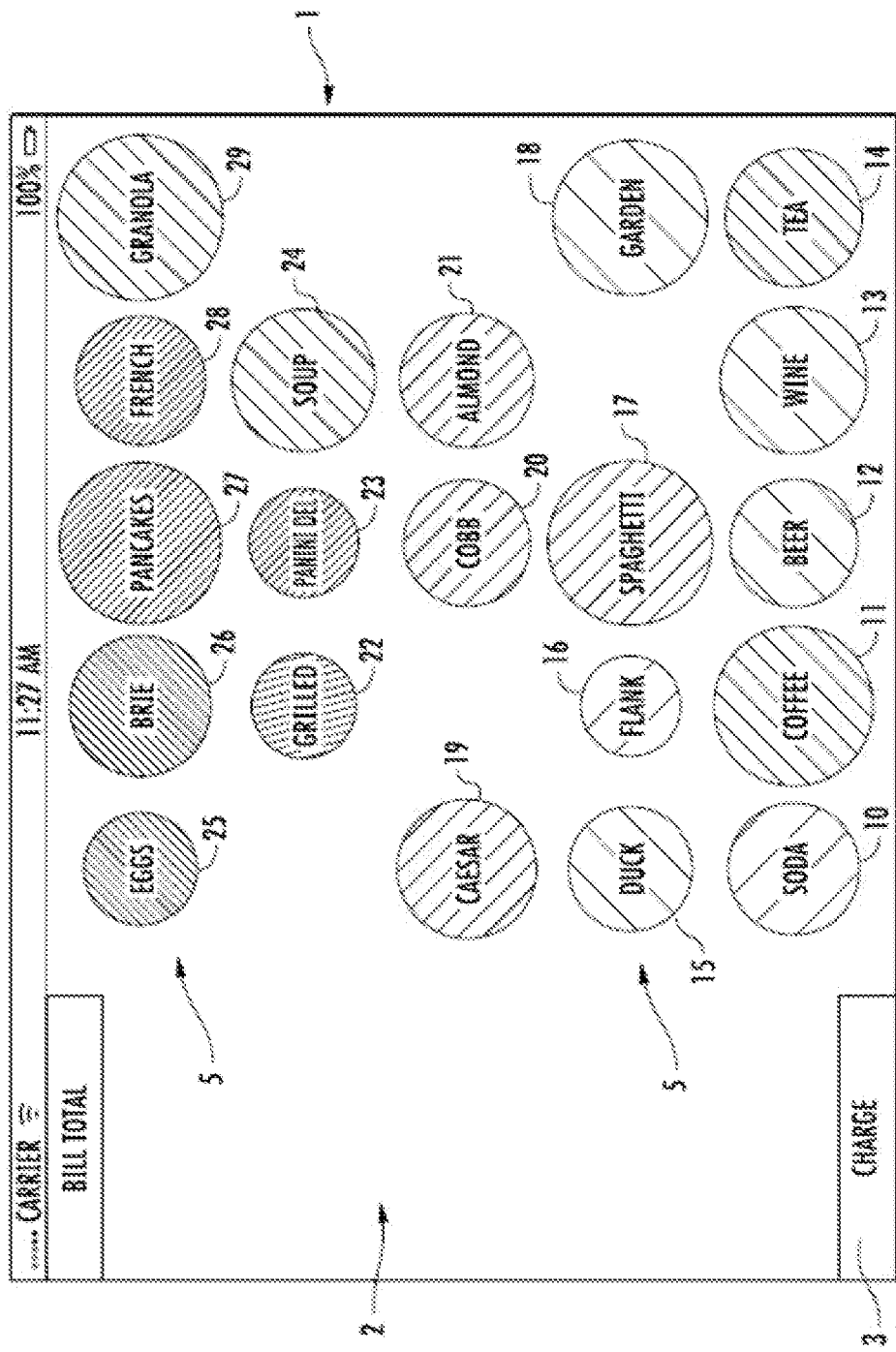
FIGS. 8 and 9 illustrate the example interfaces of FIG. 7 having a plurality of dynamic icons depicting transaction data over elapsed time periods in accordance with some embodiments discussed herein.

In some embodiments, the system may give different weights to different sets of data. For example, in some embodiments, the system may prefer more recent data to older data, so more recent transaction data would be given more weight in the biasing determination than stale transaction data. FIG. 8 illustrates an exemplary embodiment of the interface 1 that may be displayed by, for example, the dynamic application environment, wherein the sizes of the dynamic icons 5 are visually biased to indicate transaction data of the represented items. For example, the coffee dynamic icon 11 and spaghetti dynamic icon 17 of the embodiment shown in FIG. 8 are determined to be more popular based on transaction data, i.e., more frequently purchased or more frequently selected. Thus, the coffee dynamic icon 11 and spaghetti dynamic icon 17 are visually biased (i.e., their sizes have been increased) relative to the other dynamic icons. In contrast, the flank dynamic icon 16 and eggs dynamic icon 25 of the embodiment shown in FIG. 8 are used less frequently so their sizes have been reduced. In some embodiment, visually biased dynamic icons (e.g., coffee dynamic icon 11 and spaghetti dynamic icon 17) may be referred to as suggested dynamic icons while other dynamic icons (i.e., flank dynamic icon 16, eggs dynamic icon 25, cobb dynamic icon 20) may be referred to as secondary dynamic icons.

In some embodiments, the system visually biases the features of the dynamic icons 5 relative to one another based on a comparison of their transaction data. For example, if the spaghetti dynamic icon 17 in the embodiment shown in FIG. 8 is selected more often than the eggs dynamic icon 25 (or if transaction data processed by one or more back-end servers suggest spaghetti is sold more frequently than eggs), the spaghetti dynamic icon 17 may grow relative to the eggs dynamic icon 25 and the eggs dynamic icon 25 may shrink relative to the spaghetti dynamic icon 17. In some other embodiments, the system may independently bias the features of the dynamic icons 5 without relating them to each other.

In some embodiments of visual biasing, the bias of the dynamic icons may be changed as needed by the system to indicate an item's relative transaction data (e.g., popularity) and not necessarily to indicate the overall transaction data (e.g., the absolute popularity) of an item. For example, grilled chicken 22 and flank 16 dynamic icons in FIG. 8 may still be chosen frequently on an absolute or objective basis, but the pancakes 27, granola 29, and spaghetti 17 dynamic icons 5 may be selected (or sold based on transaction data) relatively more often. Thus, in this example, the pancakes 27, granola 29, and spaghetti 17 dynamic icons 5 may be sized a bit larger than the grilled chicken 22 and flank 16 dynamic icons.

In some embodiments, the dynamic icons 5 and the interface 1 may be scaled to fit the type of display or screen being used. In an example embodiment, the dynamic icons 5 may be proportional to one another such that as one dynamic icon increases in size the remainder of the dynamic icons decrease in size so that all of the dynamic icons take up approximately the same amount of display space as before. Additionally, in some embodiments, the dynamic icons 5 may be configured to overlap one another if they grow sufficiently large, or they may be configured to deflect away from each other so as to avoid overlapping. In some other embodiments, the dynamic icons 5 may be bounded to a certain grid or zone, such that they are not permitted to expand outside of their designated zone. In some embodiments, when a dynamic icon 5 is visually biased to grow to a maximum size for its allocated grid or zone, the remainder of the dynamic icons 5 may be shrunk rather than continuing to increase the size of such visually biased dynamic icon.

Figure 9:
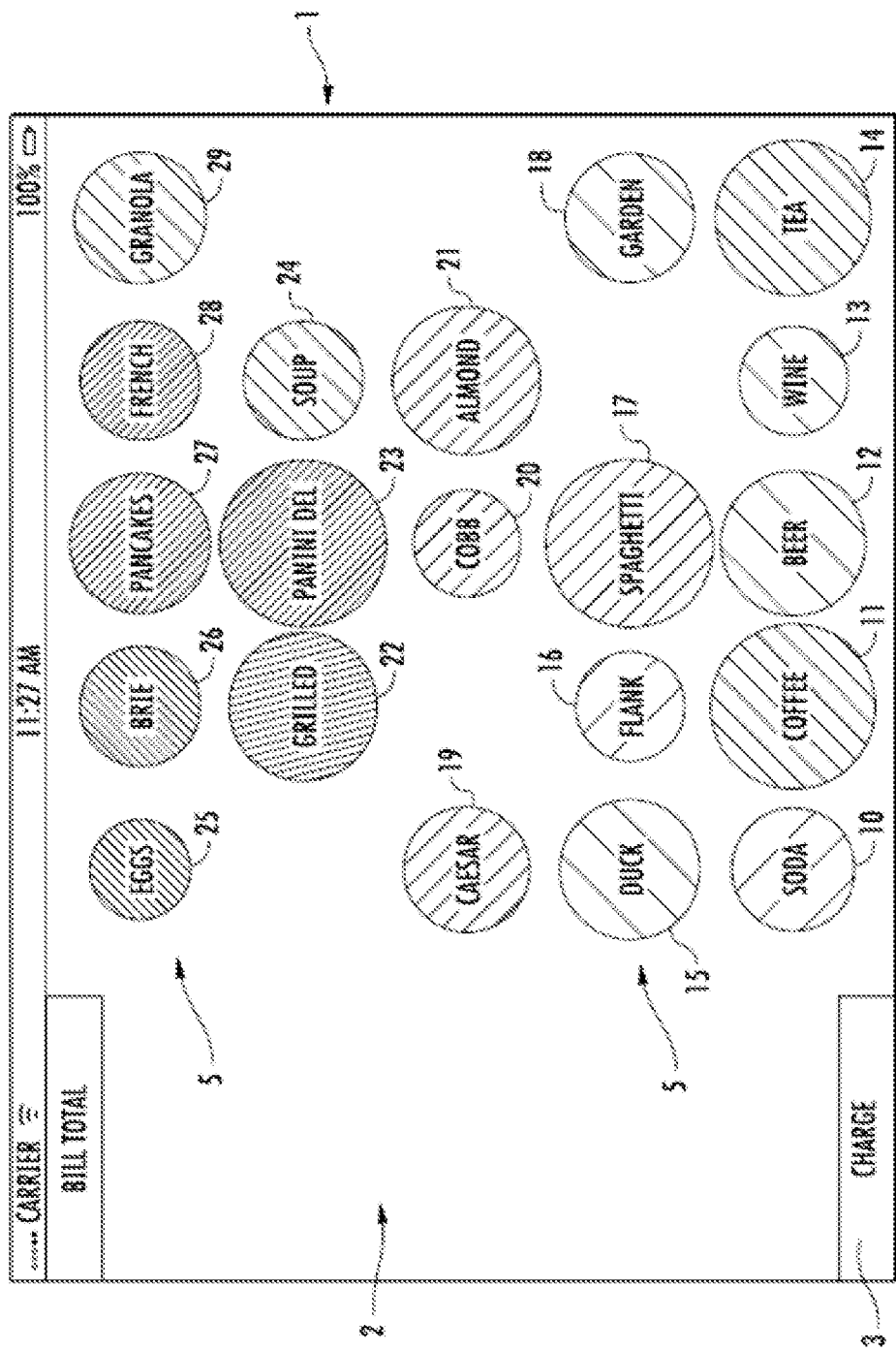

As will be detailed below, the visualizations of the dynamic icons 5 may be biased in any increment or over any time period or set of data depending on interests of the consumer, provider, and/or promotion and marketing service and the specific application. In some embodiments, the biasing may be updated after each selection indication, or alternatively, it may be updated on a transactional or temporal basis. FIG. 8 illustrates the interface 1 of FIG. 6 having visually biased dynamic icons 5 after an exemplary time period of one month. FIG. 9 demonstrates an example interface 1 having visually biased dynamic icons 5 after an exemplary time period of two months.

For example, in the embodiments shown in FIGS. 7-9, the size of each dynamic icon 5 is biased relative to, for example, respective transaction data of the dynamic icons and/or based on item transaction data processed by one or more back-end systems. For example, in these embodiments, the usage rate indicated in the transaction data of wine 13 remained generally constant during the one month period between FIG. 7 and FIG. 8, however, the transaction data of wine 13 dropped during the two month period between FIG. 7 and FIG. 9.

Returning to FIG. 4, as described above, profile data may comprise any data associated with a profile identifier, such as, but not limited to, transaction data, biographical data, preference data, or any other data that may serve to distinguish one or more profiles from each other. Environmental data may include, for example, a time of day, time of year, weather, season, geographic or hyper-geographic location, or any other data that may provide context. And as such, in an exemplary embodiment, in additional to profile data (e.g., past transaction data such as past purchase history), factors such as orientation of the screen, time of day, hyper-geographic location may contribute to the determination and rendering of the dynamic application environment.

In other embodiments, any combination of any of, for example the following data/signals, may contribute to the determination and/or rendering of the dynamic application environment. That is, the system may consider at least one or more of the following signals, each if which may be weighted, filtered, or used in connection with various heuristic or machine learning algorithms discussed in greater detail herein, including:

a. Popularity, as indicated by usage rate, selection rate, sell-out rate, or any other indication of an item's desirability b. Item data, including:
  i. transaction data
  ii. business data
  iii. environmental data
  iv. characteristic information c. Transaction data, including:
  i. sales data, such as past and predicted revenue, the amount of an item sold, profits, or any other sales metric
  ii. redemption data
  iii. return data
  iv. transaction metadata (e.g. data associated with a transaction including: hyper-geographic location; time of day; season; weather; consumer identification data including gender, age, socioeconomic status; item information; or provider information)

d. Profile ID or Profile identifier (e.g. IP address, MAC address, customer number, merchant number, store number, etc.)

e. Profile Data, including:
  i. past transaction data
  ii. biographical data
  iii. preference data f. Inventory data g. Other business data, including:
  i. goals
  ii. quotas
  iii. revenue
  iv. number of customers
  v. sales h. Environmental signals, including:
  i. time of day
  ii. season
  iii. weather
  iv. geographic or hyper-geographic location The dynamic application environment may be used as part of a standalone service, application, or device or it may be applied as a layer atop an existing service application or device. Returning to FIG. 4, the user device may therefore be configured to receive the dynamic application environment and display, for example, components of the dynamic application environment on a dynamic application interface.

Upon display of the dynamic application environment, input may be received. Accordingly, as shown in block 420 of FIG. 4, an apparatus, such as apparatus 200, may be configured for receiving, accessing, capturing, and/or determining one or more interface event data. In some embodiments, interface event data may be based on user interaction with the dynamic application interface. Interface event data may comprise one or more interface events, each interface event occurring a particular time, and the particular time (e.g., timestamp) at which each of the one or more interface events occurred.

In some embodiments, interface events may be input signals that may be derived from, but are not limited to, text input, searches, scrolls, swipes, icon clicks, presses, selections, or mouseovers, category clicks, presses, selections, or mouseovers, and/or item clicks, presses, selections, or mouseovers. In some embodiments, a lack of text input, searches, scrolls, swipes, clicks, presses, selections, or mouseovers may be considered an interface event and logged. That is, a lack of conventional input may be informative as a user may be reading, confused, unengaged or the like, which may, in some embodiments, be useful in performing design improvements. In some embodiments, interface events may be captured, for example, from a wearable device that is tethered to a mobile device (e.g., Google Glass® or Apple Watch®) or, for example, additionally or alternatively, from a wearable device that is untethered to a mobile device (e.g., Pebble watch). In an exemplary embodiment, an interface event derived from use of the wearable device may be considered simply another peripheral input device for the mobile device. Additionally or alternatively, in an exemplary embodiment in which the wearable device is untethered from another mobile device, the same infrastructure for capturing and playing back user input on a conventional mobile device may be utilized.

In some embodiments, the user device may transmit with, prior to or subsequent to the interface event data, dynamic application environment data. In other embodiments, when interface event data is received, the recording module may request, receive, or make an API call to the promotion and marketing service to determine and/or identify a context of the event data. The dynamic application environment data and/or context data may be stored in association with the event data.

In yet another embodiment, only the interface event data is received, accessed, captured or determined, and the context of the interface event data is determined in association with the initialization of a play back environment, which will be discussed below.

Subsequent to the receiving, accessing, capturing or determining of interface event data, the interface event data may be stored or logged. Accordingly, as shown in block 430 of FIG. 4, an apparatus, such as apparatus 200, may be configured for storing the interface event data. In some embodiments, the interface event data is stored discreetly (e.g., as an interface event and a time at which the interface event occurred), whereas in other embodiments, the interface event data is stored as a log. In other embodiments, predefined events may be stored discreetly while other events are stored in a log. In some embodiments, the events are stored locally, compressed, and uploaded to the promotion and marketing system database.

Initialization and Playback Operation

FIG. 5 shows a flowchart depicting an example of a process 400 for initializing a play back environment and playing back interface events captured from the dynamic application environment on the play back environment, in accordance with embodiments of the present invention. The flowchart shows that to initialize the play back environment, data from both the dynamic application environment and the play back environment may be considered. The process 400 may be performed by an apparatus, such as the apparatus 200 described above with respect to FIG. 2.

As shown in block 510 of FIG. 5, an apparatus, such as apparatus 200, may be configured for receiving, accessing, capturing, and/or determining play back device data. Play back device data may include, for example, software information (e.g., application version, operating system) and hardware information (e.g., device information (e.g., screen size, screen resolution, etc.), model number, model specifications, etc.).

As shown in block 520 of FIG. 5, an apparatus, such as apparatus 200, may be configured for receiving data indicative of the dynamic application environment. As described above, many factors contribute to the determination and rendering of the dynamic application environment, and in order to recreate or near recreate such an environment, at least a portion of that data may be considered.

In some embodiments, the apparatus may be configured for identifying an initial state of the dynamic application environment based on the profile data, environmental data, transaction data, relevance data, and implicit data derived from a combination of one or more of the profile data, environmental data, transaction data, and relevance data and providing data configured for implementing a play back state based on the initial state, the play back state configured to recreate a same computing environment on the play back device.

In some embodiments, to capture the dynamic application environment in a manner such that it can be reproduced during playback, the apparatus may be configured to determine device location at the time the user interacted with the app. That is, in some embodiments, unique, customized or other otherwise different results may be provided based on the location of the user, and as such, to reproduce those results, the location of the user may be necessary. Moreover, the apparatus may be configured to determine or otherwise log the presence of any persistently-saved files at the time the user interacted with the application. For example, the user can choose a particular division (e.g., San Jose) that affects, for example, what is provided via the user interface (i.e. what they see). This choice gets stored persistently, and accordingly, to reproduce their environment, the application may grab any of those types of files.

That is, once both the environment in which the user event data was captured and the play back device have been considered, a play back state may be generated and/or determined. As such, as shown in block 530 of FIG. 5, an apparatus, such as apparatus 200, may be configured for providing data to the play back device configured for initializing a play back environment, such that the play back environment receives the interface event data and performs play back. For example, in an instance in which, the dynamic application environment was provided on a mobile device (e.g., a smart phone or the like) and the play back device is a computer, such as a laptop or desktop, having generally a much larger screen than a smart phone, the data that may be provided to the play back device configured for initializing a play back environment may scale the interface, limit playback to a portion of the lap top or desktop monitor, or the like. Other notable characteristics that may be accounted for in the data that may be provided to the play back device configured for initializing a play back environment are differences in processing power, screen resolution, orientation, etc.

In some embodiments, not all information that factors in the dynamic application environment is provided to the play back device configured for initializing a play back environment. For example, particular promotions such as those provided in the dynamic application environment based on relevance, past purchase history or the like may not be provided, while only information indicative that a promotion occupies a particular portion of the interface at a particular time. In other embodiments, the particular promotions are not provided, but a category, sub-category, price range or other promotion components may be provided.

Once a play back environment on the play back device is established or implemented, interface event play back may be performed. As shown in block 540 of FIG. 5, an apparatus, such as apparatus 200, may be configured for accessing the interface event data. For example, in an instance in which interface event data is stored discreetly, the apparatus may access one or more interface events and the associated time of occurrence for play back. In an instance in which the interface event data was stored in a log file, the log file may be accessed. Subsequently, as shown in block 550 of FIG. 5, an apparatus, such as apparatus 200, may be configured for extracting the one or more interface events and the particular time of occurrence from, for example, the log file.

The interface events may then be transmitted. Accordingly, as shown in block 560 of FIG. 5, an apparatus, such as apparatus 200, may be configured for outputting, via the communications module, to the play back device, the one or more interface events in a time scale relative to the particular times of the occurrence of the interface events. That is, the apparatus may comprise, in some embodiments or have access to a timer, such that the interface events are provided according to their particular time of occurrence. In some embodiments, the relative time is real time (e.g., the same relative time at which the interface events were captured), whereas in other embodiments, the relative time is an increased or decreased time. In some embodiments, the play back environment may be configured to enable the play back time scale to be increased or decreased during play back. In some embodiments, the input may be a scrub functionality, which is a, for example, swipe input, left or right, and having a particular speed, where the play back is performed based on the swipe direction and relative to the particular speed of the swipe.

In some embodiments, the play back module may be configured to aid in performance of debugging and/or quality assurance. For example, in some embodiments, the apparatus may be configured for receiving input from the play back device and performing at least a pause, rewind, fast-forward, speed up, or slow-down in the transmission of the interface event data in response to the input. In other embodiments, the apparatus may be configured for receiving input from the play back device and providing a single interface event at a time in response to the input. For example, a play back device being used for, for example, quality assurance may be configured to provide input to the play back module. The play back module may then provide the interface events one at a time, such the debugging or quality assurance is able to see the events visually, as opposed to viewing a log file, and their results as the dynamic application environment changes accordingly.

In some embodiments, the play back environment may be a hierarchy or a tree structure indicative of the dynamic application environment. The play back module may then provide visual indication of where the user is in the hierarchy or tree structure with each interface event. Here, in some embodiments, interface event data from two or more users may be overlaid. In some embodiments, a single visual display of the interface event data may be provided such that those portions of the dynamic application environment are colored, bolded or the like where increased usage has occurred. Moreover, in some embodiments, the single visual display from two or more users may be overlaid creating a "heat" map or the like.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for capturing and playing back interface event data comprising at least one processor, and a memory associated with the at least one processor having computer coded instructions therein, the apparatus comprising:
   a dynamic application environment determination and rendering module configured for:
     providing a dynamic application environment; and
     displaying the dynamic application environment on a dynamic application interface;
   a recording module, the recording module configured for:
     capturing interface event data, the interface event data being based on user interaction with the dynamic application interface, the interface event data comprising one or more interface events and a particular time at which each of the one or more interface events occurred;
   an initialization module, the initialization module configured for:
     receiving play back device data;
     receiving data indicative of the dynamic application environment;
     providing data to a play back device configured for initializing a play back environment, such that the play back environment receives the interface event data and performs play back; and
   a play back module, the play back module configured for:
     accessing the interface event data; and
     outputting the one or more interface events in a relative time to the particular time.

2. The apparatus of claim 1, wherein
   the recording module is further configured for:
     storing the interface event data; and
   the play back module is configured for:
     extracting the one or more interface events and the particular time of occurrence.

3. The apparatus of claim 1, wherein a time scale at which the one or more interface events are provided to the play back device is real time.

4. The apparatus of claim 1, where the initialization module is further configured for:
   identifying an initial state of the dynamic application environment based on profile data, environmental data, transaction data, relevance data, and implicit data derived from a combination of one or more of the profile data, environmental data, transaction data, and relevance data; and
   providing data configured for implementing a play back state based on the initial state, the play back state configured to recreate a same computing environment on the play back device.

5. The apparatus of claim 1, wherein the initialization module provides a portion of the data indicative of the dynamic application environment to the play back device, the portion of information comprising one or more of a category, a sub-category, or a price range of a relevant promotion being provided via an impression in the dynamic application environment.

6. The apparatus of claim 1, wherein interface events comprise one or more of text input, scrolls, swipes, clicks, presses, selections, or mouseovers.

7. The apparatus of claim 1, wherein interface event data comprises:
    a lack of one or more of text input, scrolls, swipes, clicks, presses, selections, or mouseovers; and
    a time period for the lack of the text input, scrolls, swipes, clicks, presses, selections, or mouseovers.

8. The apparatus of claim 1, wherein the play back module is further configured to aid in performance of debugging by receiving input from the play back device and performing at least a pause, rewind, fast-forward, speed up, or slow-down in transmission of the interface event data in response to the input.

9. The apparatus of claim 1, wherein the play back module is further configured to aid in performance of quality assurance or debugging by receiving input from the play back device and providing a single interface event at a time in response to the input.

10. A method for capturing and playing back interface event data, the method comprising:
    providing, via a dynamic application environment determination and rendering module, a dynamic application environment;
    displaying the dynamic application environment on a dynamic application interface;
    capturing, via a recording module, interface event data, the interface event data being based on user interaction with the dynamic application interface, the interface event data comprising of one or more interface events and a particular time at which each of the one or more interface events occurred;
    receiving, via an initialization module, play back device data;
    receiving data indicative of the dynamic application environment;
    providing data to a play back device configured for initializing a play back environment, such that the play back environment receives the interface event data and performs play back;
    accessing, via a play back module, the interface event data; and
    outputting the one or more interface events in a relative time to the particular time.

11. The method according to claim 10, further comprising:
    storing, via the recording module, the interface event data;
    accessing, via the play back module, the interface event data; and
    extracting the one or more interface events and the particular time of occurrence.

12. The method according to claim 10, wherein a time scale at which the one or more interface events are provided to the play back device is real time.

13. The method according to claim 10, further comprising:
    identifying, via the initialization module, an initial state of the dynamic application environment based on profile data, environmental data, transaction data, relevance data, and implicit data derived from a combination of one or more of the profile data, environmental data, transaction data, and relevance data; and
    providing data configured for implementing a play back state based on the initial state, the play back state configured to recreate a same computing environment on the play back device.

14. The method according to claim 10, further comprising:
    providing, via the initialization module, a portion of the data indicative of the dynamic application environment to the play back device, the portion of information comprising one or more of a category, a sub-category, or a price range of a relevant promotion being provided via an impression in the dynamic application environment.

15. The method according to claim 10, wherein interface events comprise one or more of text input, scrolls, swipes, clicks, presses, selections, or mouseovers.

16. The method according to claim 10, wherein interface event data comprises:
    a lack of one or more of text input, scrolls, swipes, clicks, presses, selections, or mouseovers; and
    a time period for the lack of the text input, scrolls, swipes, clicks, presses, selections, or mouseovers.

17. The method according to claim 10, further comprising:
    aiding in performance of debugging by receiving, via the play back module, input from the play back device and performing at least a pause, rewind, fast-forward, speed up, or slow-down in transmission of the interface event data in response to the input.

18. The method according to claim 10, further comprising:
    aiding in performance of quality assurance or debugging by receiving, via the play back module, input from the play back device and providing a single interface event at a time in response to the input.

19. A computer program product for capturing and playing back interface event data, the computer program product comprising at least one non-transitory computer-readable storage medium having computer-executable program code instructions stored therein, the computer-executable program code instructions comprising program code instructions for:
    providing, via a dynamic application environment determination and rendering module, a dynamic application environment;
    displaying the dynamic application environment on a dynamic application interface;
    capturing, via a recording module, interface event data, the interface event data being based on user interaction with the dynamic application interface, the interface event data comprising one or more interface events and a particular time at which each of the one or more interface events occurred;
    receiving, via an initialization module, play back device data;
    receiving data indicative of the dynamic application environment;
    providing data to a play back device configured for initializing a play back environment, such that the play back environment receives the interface event data and performs play back; and
    accessing, via a play back module, the interface event data; and
    outputting the one or more interface events in a relative time to the particular time.

20. The computer program product according to claim 19, wherein the computer-executable program code instructions further comprise program code instructions for:
  storing, via the recording module, the interface event data;
  accessing, via the play back module, the interface event data; and
  extracting the one or more interface events and the particular time of occurrence.

\* \* \* \* \*